(12) United States Patent
Drost et al.

(10) Patent No.: US 6,772,608 B1
(45) Date of Patent: Aug. 10, 2004

(54) METHOD FOR PRODUCING UV POLARIZERS

(75) Inventors: Wolf-Gernot Drost, Halle (DE); Andreas Berger, Halle (DE)

(73) Assignee: F.O.B. GmbH Gesellschaft Zur Fertigung Farbiger Optoelektronischer Bauelemente, Gröbers (DE)

(*) Notice: Subject to any disclaimer, the term of this patent is extended or adjusted under 35 U.S.C. 154(b) by 0 days.

(21) Appl. No.: 09/720,955

(22) PCT Filed: Jun. 17, 1999

(86) PCT No.: PCT/DE99/01783

§ 371 (c)(1),
(2), (4) Date: Jan. 3, 2001

(87) PCT Pub. No.: WO00/02069

PCT Pub. Date: Jan. 13, 2000

(30) Foreign Application Priority Data

Jul. 4, 1998 (DE) .......................................... 198 29 970

(51) Int. Cl.⁷ ............................................... C03B 32/02
(52) U.S. Cl. ...................... 65/30.1; 65/30.13; 65/30.14; 65/32.1; 65/32.3; 65/33.1; 65/33.3
(58) Field of Search ................................ 65/30.1, 30.11, 65/30.13, 30.14, 32.1, 32.3, 33.1, 33.2

(56) References Cited

U.S. PATENT DOCUMENTS

| | | | |
|---|---|---|---|
| 3,637,453 A | * | 1/1972 | Simmons |
| 3,653,863 A | | 4/1972 | Araujo et al. |
| 4,049,338 A | | 9/1977 | Slocum |
| 4,076,544 A | | 2/1978 | Kerko et al. |
| 4,304,584 A | | 12/1981 | Boreelli et al. |
| 4,486,213 A | | 12/1984 | Lentz et al. |
| 5,122,907 A | | 6/1992 | Slocum |
| 5,491,117 A | | 2/1996 | Kerko et al. |

FOREIGN PATENT DOCUMENTS

| | | |
|---|---|---|
| DE | 28 18 103 | 11/1979 |
| DE | 29 27 230 | 1/1981 |
| DE | 31 50 201 | 7/1982 |
| DE | 198 29 970 | 1/2000 |
| EP | 0 416 157 | 9/1989 |
| EP | 0 521 591 | 1/1993 |
| EP | 0 698 583 | 2/1996 |
| WO | 98/14409 | 4/1998 |

* cited by examiner

Primary Examiner—John Hoffmann
(74) Attorney, Agent, or Firm—Collard & Roe, P.C.

(57) ABSTRACT

The invention relates to a method for producing UV polarizers, according to which spheroid particles situated near the surface of the glass are incorporated into the support material (primarily standard float glass) in a novel arrangement. According to the method for producing UV polarizers, after the introduction of metal ions (e.g., silver ions) into the glass surface, a large size distribution of particles is achieved by multiple alternation of a heat treatment for separating out spherical metal particles, followed by the renewed introduction of metal ions and a subsequent heat treatment. A deformation of the glass produces spheroid particles of various sizes and different semi-axis relationships. The particles are characterized by their large size distribution and are deformed differently in relation to their spheroid shape. In this way UV polarizers are produced which have a wide absorption range since the absorption bands having different maximum positions overlap.

9 Claims, 1 Drawing Sheet

METHOD FOR PRODUCING UV POLARIZERS

CROSS-REFERENCE TO RELATED APPLICATION

Applicants claim priority under 35 U.S.C. 119 of German Patent Application No. 198 29 970.2 filed Jul. 4, 1998. Applicant also claims priority under 35 U.S.C. 365 of International Application No. PCT/DE99/01783 filed Jun. 17, 1999. The PCT Patent Application was not published in English under PCT article 21(2).

BACKGROUND OF THE INVENTION

1. Field of the Invention

The invention relates to a method for producing UV polarizers in which polarization is effected by dichroitic absorption, and where revolution-ellipsoidal metal particles in a novel arrangement are embedded in the support material, the latter being preferably standard float glass. Said polarizers have a wide absorption range over the UV spectrum. The method uses the metal particles' dichroitic behavior, which undergoes some alterations by specific process steps to embed and treat submicroscopic metal particles within the support material.

Basically, there are several physical principles which can be used to produce plane-polarized light from non-polarized, or part-polarized light.

For instance, when utilizing the double refraction effect to produce plane-polarized light, it is the light's behavior that if in optically anisotropic media the incident light ray does not propagate along the optical axis it is divided into both an extraordinary and an ordinary light ray the polarized wave planes of which are vertically arranged to each other. Examples of application are polarizers that have been known for years such as Nicol prism, Glan Thompson prism, Wollaston prism, etc., whose structure, however, is rather solid (which makes them expensive), and they have an only limited useful surface, and they must be put very precisley into their working positions, too. Furthermore, their polarizing effect is strongly wave range dependent.

In case of inclined reflection of non-polarized light on transparent isotropic bodies the reflected light ray is part-polarized, with the component whose wave plane is arranged vertically to the plane of incidence being the preferably reflected one. If the angle of incidence is equal to the Brewster angle, the reflected light ray will be completely plane-polarized. This effected is utilized, for example, in polarizing beam splitters, the disadvantages, however, are the same as they are with polarizer prisms.

2. The Prior Art

In DE-OS 28 18 103, there is a "Method for Producing Polarizers made up of a great number of electrically conductive strips arranged all in parallel on a glass pane carrier" described, based on the so-called Hertzian polarization. Also, in EP 0416 157 A1, entitled "Polarizer", such Hertzian polarization is used as a basis.

One of the main disadvantages in connection with these Hertzian polarizers is that they reflect the unwelcome polarization component, an effect which is found bothersome in many fields of application, especially when used in displays. While this type of polarizers is successfully utilized in the IR range, they could not yet effectively be used in the visible, or even in the UV range due to manufacturing problems in producing an exactly constant metal filament grid.

The majority of polarizers employed nowadays uses the dichroitic absorption to produce polarizing effects. The principle here is that certain molecules, or crystals, show a wave plane orientation dependent absorption effect. With the layer being sufficiently thick, and the molecules or crystals in an isotropic orientation, only a plane-polarized component exits from the polarizer.

In this context, the biggest group is represented by mechanically stretched plastic films colored by using dichroitic colorants, because such films can be produced in a very cost-efficient way. Stretching makes the colorant molecules light-absorbent in an oriented way. Despite the great progress made in producing such type of films (which has been reflected in the relatively big number of patents) the basic disadvantages such as chemical instability, sensitivity to UV rays, poor mechanical durability could not be removed. As a rule, these films can not be employed when the UV range is involved.

Dichroitic crystals, in particular non-spherical metal particle, are deemed to be most promising in compensating for those disadvantages. Especially non-spherical silver particles, 5 nm–50 nm in size, are bringing about the desired effects in the wave range from 350 nm to 1,000 nm, owing to their special electronic configuration. So, there are different starting-points from which to use this behavior.

Both U.S. Pat. No. 4,049,338 (Light polarizing material method and apparatus) and U.S. Pat. No. 5,122,907 (Light polarizer and method of manufacture) suggest using oriented revolution-ellipsoidal metal particles to be produce by precipitation on a smooth glass or plastic surface. The particles' eccentricity is controlled by said precipitation process so that maximum absorption positions can be achieved between 400 nm and 3,000 nm.

The disadvantage connected with this process is the mechanical sensitivity of the layers produced by it, which cannot be easily compensated for by applying protective coats as this would change the refractive index in the particles' environs and consequently lead to a shift in the maximum positions.

DE 29 27 230 C2 (Method for producing a polarizing glass film, glass films produced in accordance with it, and utilization of such films in liquid crystal displays) describes a process for the manufacture of a polarizer to be used in liquid crystal displays. They start from an organic, or inorganic glass melt into which pin-shaped bodies are added, and at last a glass film is drawn from. In connection with the invention to be disclosed, the above method is deemed disadvantageous in that no thin layers, i.e., no only near-surface layers can be realized.

There is a variety of suggestions made for producing polarizers having halide containing glasses as base material. Such glasses contain metal halide compounds, e.g., AgCl, AgBr, etc., out of —or in—which the metal part has precipitated. When the glass matrix is mechanically deformed, these particles receive a nonspherical shape which makes them behave in a dichroitic way.

U.S. Pat. No. 3,653,863 (Method of forming photochromic polarizing glasses) describes the manufacture of high-polarizing glasses, using phase-separated or photosensitive (i.e., silver halide containing) glass materials that must be tempered in order to produce silver halide particles of the desired size. There are two other steps to follow: firstly, at temperatures between upper cooling point and glass-transition temperature, i.e., 5000° C. to 600° C., the glass is drawn, extruded, and rolled in order to give the silver halide particles an ellipsoidal shape and the desired orientation. When the glass is subjected to radiation (i.e., by UV rays), metallic silver precipitates on the surface of the silver particles, which means that this type of glasses can be switched—by being subjected to radiation—between a clear non-polarized state and a dark-tone polarized state.

Another method of manufacturing polarizing glass by metallic silver precipitation is suggested in U.S. Pat. No. 4,304,584 (Method for making polarizing glasses by extrusion). Below its cooling point, the glass is tempered in a reducing atmosphere in order to produce metallic silver in a long-stretched out form within a surface-near layer which is at least 10 $\mu$m thick. This process includes the production of a sandwich-type glass, combining layers of polarizing and photosensitive glass into a laminated structure.

From WO 98/14409, we know a polarizer that uses glass in which metal particles showing a large size profile are embedded. In order to produce such type of polarizer, the process starts with making a specific metal compound form deposits of varying sizes inside the glass material. After that, the glass together with the precipitated matter is subjected to a single-direction stretching process, which forces the deposits into particles of a longish, revolution-ellipsoidal shape, and—as a side-effect—parallels them. The final tempering step reduces the precipitated metal compounds, which brings about metal particles of a revolution-ellipsoidal shape located in a near-surface layer of the glass. These particles show varying deformations as far as their revolution-ellipsoidal shape is concerned, depending on the size of the deposit they originate from.

Just to mention it in brief, it is known (cf. for example U.S. Pat. No. 5,122,907, (Light polarizer and method of manufacture)) that the positions of the desired wave length bands as they are produced by such type of polarizer depend on the metal revolution-ellipsoidal particles, volumes and axial ratios.

To create metal particles with higher eccentricities, U.S. Pat. No. 4,486,213 (Drawing laminated polarizing glasses) suggests that metal halide containing glass should be enclosed in glass of another type before the deformation step takes place.

The basic disadvantage the above methods and glass materials have all in common is that they require complex and expensive special glasses. Obviously owing to this complexities and difficulties in handling the glasses, the field of application could not be successfully extended so far to the short-wave end of the visible light range, or even to the UV spectrum.

At last, reference should be made to DE 3150 201 A1 (Method for producing polarizing spectacle glass). A pane of spectacle glass, containing a metal oxide that can be reduced (e.g., silver oxide), is heated in a reducing atmosphere over a period of time that is long enough to reduce the metal oxide into its metallic state at least on one of the panels side in a near-surface layer of certain thickness. After the metal oxide underwent such reduction the pane is kept at an increased temperature level to allow the reduced oxide to nucleate. Subsequently, the pane is drawn in a special device to allow the metal nuclei to be stretched along parallel lines. The method's disadvantage is the need to use glasses melted in a special process, which limits the glass' silver content that can be reached in praxi to some 0.05 per cent to 0.5 per cent by weight. In addition, only narrow extinction bands may be created.

For polarizers in practice-oriented UV applications, however, broad-band extinction curves are of special interest. Halogen bulbs, having a distinct line spectrum, are the preferred light sources in this spectral region. To reach light intensities as high as possible, more than one of these lines must be used, and—as a consequence—broad-band polarizers are needed to produce polarizing effects over a wave length range as broad as possible.

SUMMARY OF THE INVENTION

According to an object of the invention, a method shall be suggested after which UV polarizers that show polarization effects over a wave length range as broad as possible can be produced in a cost-efficient way using simple starting materials.

According to the invention, this object is achieved by using the method as described. The method according to the invention is further developed.

The object according to the invention is further explained, as follows.

It is widely known that in case of uniformly oriented revolution-ellipsoidal particles their absorption behavior differs plainly recognizably from that of spherical ones, and depends on the orientation of the polarized wave planes. When, for example, using silver revolution-ellipsoidal particles whose semiaxis ratio a/b=2, this so-called dichroitic behavior makes the dichroitic silver absorption band very narrow, i.e., it does not meet the requirements in accordance with the invention's aims. However, the method according to the invention makes it possible to create a broad absorption range by creating bands that have different maximum positions which will overlap.

We have been successful in our attempt to create inside the glass material particles of different sizes which lead to at least two absorption bands whose maximum positions differ plainly recognizably from each other and, when being overlapped, make the dichroitic absorption region broader. The UV polarizer, utilizing this principle, has novel features that lie mainly in the structure of the near-surface area.

Basically, the metal stuff, e.g., silver, copper, gold, etc., may be added right into the glass melt, however, this might be disadvantageous as the metal spreads over the whole volume of glass batch, which makes a definite and productive subsequent color structuring incomprehensible. Other limiting factors include the fact that this way only low concentration levels inside the glass may be achieved. Alternatively, a subsequent embedding of metal stuff into the glass could provide a solution. Nearly all sorts of chemical elements can be embedded into glass surfaces by using ion implantation methods. Also, this can already be made targeted to selected local areas, as well as implanting various combinations of chemical elements. Penetration depths of up to several 100 nm can be realized. On the other hand, ion implantation is a rather complicated method, technological-wise.

Ion exchange methods are particularly used to embed silver or copper ions into alkaline-containing glasses in a relatively cost-efficient way. To do this, the glass is brought into contact with a silver and/or copper containing salt melt, which causes alkaline ions of the glass being replaced by metal ions from the melt. From a practical point of view, low-temperature ion exchanges in nitrate melts (i.e., at temperatures from approx. 250° C. to 400° C.) proved extremely favorable, in particular due to the fact that the salts are soluble in water and, therefor, can be easily removed from the glass.

In principle, other salts may also be employed, however, they melt at higher temperatures, as a rule.

The metal ions' penetration depth into the glass depends on how long and at what temperatures such ion exchange takes place. In case of low-temperature ion exchange processes in a nitrate melt some few μm up to several 100 μm can be expected.

As explained, the embedding of metal ions by ion implantation and ion exchange processes makes up the first step of the method, according to the invention.

In a subsequent tempering step (at temperatures in a range from 400° C. to 650° C.) the metal ions diffuse even into deeper areas of the glass body, become reduced and precipitate in form of crystalline particles. When tempered in a reducing atmosphere, e.g., hydrogen gas, an extremely thin (i.e., only few μm thick) metal particle containing near-surface layer is created. If, however, tempering takes place in a non-reducing atmosphere (including vacuum) the metal ions may be reduced by substances that are already existent in the glass and have a reducing effect (refining agents). This applies in particular to substances such as iron, cerium, and manganese, which are contained—in minor concentration levels—in technical sorts of glass.

The reduction of metal ions when tempering corresponds to the second step of the method as described in the invention. This only leads to a rather narrow particle size profile.

In another tempering step (after-tempering) taking place in a non-reducing atmosphere a reforming process leads to even bigger particles. In this context, reference is made to the third step of the method as described in the invention.

At this point, the above treatment is repeated. Again, metal ions are embedded into the glass (fourth step of the method as described in the invention, and again small new particles are created (fifth step of the method as described in the invention, without bringing about any great changes to the bigger particles already formed in the third step. In the following deformation process (sixth step of the method as described in the invention) the particles undergo a transformation from spherical into revolution-ellipsoidal shape. It could be demonstrated that the particles' deformation, described by their semiaxis ratios after deforming, for example, depends to a great extent on their sizes, i.e., bigger particles become more deformed than smaller ones, while the other deformation conditions and factors are the same to all size categories.

The broader size profile as produced according to the invention leads to semiaxis values distributed over a bigger range, which in turn leads to widened dichroitic absorption bands, as could be shown above.

The particles in their deformed shape are thermally stable up to temperatures near their lower cooling point. Above this temperature, however, they undergo a re-deformation back to their original spherical shape. This means that the method according to the invention may be altered so that after the third step of the method as described in the invention a deformation process might take place, to be followed by a second deformation step after the small particles have been created in the tempering step.

According to the invention, this principle is used, in a repeated treatment process, to create particle size profiles that are distinctively widened.

At temperatures above the lower cooling point the particles undergo a re-deformation and, consequently, cause a change to the dichroitic absorption bands. According to the invention, this behavior is used to tune up specific bands, whose maximum spectral positions locally differ in ranges with laterally narrow limits corresponding to local energy inputs. Also, the UV polarizers produced according to the invention are characterized by the fact that the dichroitic absorption effect is caused in an only very thin near-surface layer of the glass. If this layer is locally (i.e., partially or completely) removed, flat-structured UV polarizers can be designed, for example, by employing a lacquer mask created in a photo-lithographic process, followed by an etching step using hydro-fluoric acid applied to a certain surface area.

DETAILED DESCRIPTION OF PREFERRED EMBODIMENTS

Figure 1:
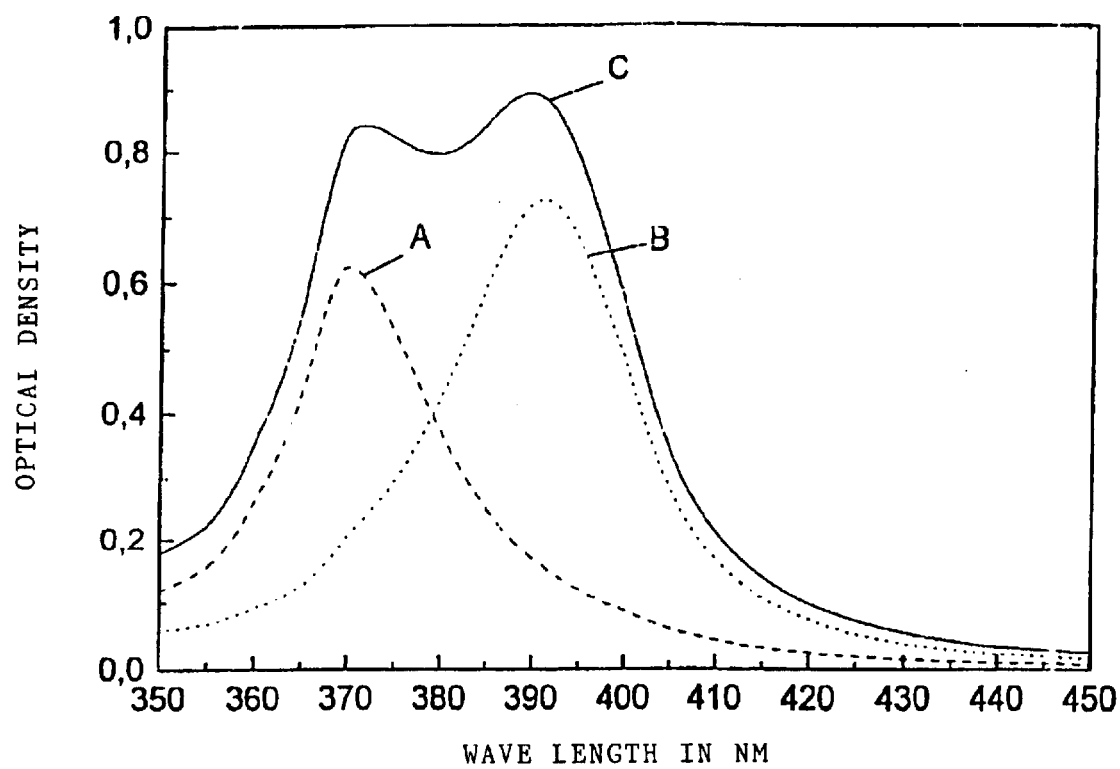
FIG. 1 shows optical density as a function of wave length in nm.

The following are five practical execution examples to explain the invention in more detail.

1$^{st}$ Execution Example

As can be seen from FIG. 1, creating and overlapping bands of different maximum positions allows formation of a broader absorption range, according to the invention. It is shown, how the two absorption bands A and B that differ in their maximum positions can be overlapped and, consequently, effect a considerably wider dichroitic absorption range as comes with the resulting band C.

2$^{nd}$ Execution Example

A standard float glass is brought into contact with a $AgNO_3/NaNO_3$ salt melt, at 350° C. over 30 minutes. Subsequently, a two-hour tempering step takes place in a hydrogen gas atmosphere at 600° C., followed by a second two-hour tempering at 600° C., in air.

In a second ion exchange process over 30 minutes at 350° C. in the $AgNO_3/NaNO_3$ salt melt together with a two-hour tempering step in a hydrogen gas atmosphere at temperatures not exceeding 600° C., small silver particles form inside the glass. In the following step, at a temperature of 600° C., the glass is subjected to a tensile force to undergo a deformation with a stretch ratio of 4. The deformation achieved in this way creates an absorption band similar to that shown as band C in FIG. 1.

3$^{rd}$ Execution Example

A standard float glass is brought into contact with a $AgNO_3/NaNO_3$ salt melt, at 350° C. over 30 minutes. Subsequently, a two-hour tempering step takes place in a hydrogen gas atmosphere at 600° C., followed by a second two-hour tempering at 600° C., in air.

In the following step, at a temperature of 600° C., the glass undergoes a deformation with a stretch ratio of 4. As a consequence of this treatment, an absorption band is created similar to that shown as band A in FIG. 1.

In a second ion exchange process over 30 minutes at 350° C. in the $AgNO_3 / NaNO_3$ salt melt together with a two-hour tempering step in a hydrogen gas atmosphere at temperatures not exceeding 525° C., silver particles of a spherical shape form again inside the glass. A second deformation step, performed in the same way as before, brings about a broaden dichroitic absorption band similar to that shown as band C in FIG. 1.

4$^{th}$ Execution Example

A photo-resist mask is applied to a UV polarizer produced after the method according to the invention (e.g., 2$^{nd}$ or 3$^{rd}$ execution example). In a photo-lithographic process this photo-resist layer receives a sort of re-structuring, followed by a five-minute selective etching in a 5% hydrofluoric acid bath, i.e., layers of base material are removed in the lacquer windows while the masked areas undergo no changes at all, and after stripping the photo lacquer, a polarizer in a structured design is completed.

5$^{th}$ Execution Example

Energy, for example in form of an electron-beam, is locally applied to a UV polarizer produced after the method according to the invention (e.g., 2$^{nd}$ or 3$^{rd}$ execution example). This energy input causes a local heating of glass, which in turn makes the particles re-deforming into their original spherical shape and entails a corresponding shift of the dichroitic bands' maximum positions. As an outcome we get structured design UV polarizers which differ in their spectral maximum positions.

What is claimed is:

1. Method for producing UV polarizers with a polarizing effect based on dichroitic absorption comprising in a first step embedding metal ions in a glass body in a near-surface layer; and in a second step tempering the glass to have the metal ions reduced to and precipitated in form of crystalline particles; and in a third step an after-tempering takes place in a non-reducing atmosphere to transform the particles produced in the second step into particles of a larger size; and in a fourth step embedding metal ions in the same manner as that done in the first step; and in a fifth step tempering the glass again, with the metal ions embedded in the fourth step precipitating in the glass in a near-surface layer in form of crystalline particles that are of a lesser size than those created in the third step; and in a sixth step deforming the glass body at temperatures near the glass transition temperature so that the particles of different sizes are all transformed into particles of revolution-ellipsoidal shapes with varying semiaxis ratios.

2. Method according to claim 1, wherein a reduction process according to the second step takes place in a reducing atmosphere.

3. Method according to claim 1, wherein the reduction process of step 2 takes place in a hydrogen gas or in a hydrogen/nitrogen gas atmosphere.

4. Method according to claim 1, wherein a reduction process according to the second step takes place in a non-reducing atmosphere with the metal ions being reduced by substances that are already existent in the glass and have a reducing effect.

5. Method according to claim 1, wherein the third step takes place at a temperature above 300° C., but not exceeding 700° C.

6. Method according to claim 1, wherein energy is locally applied to very narrow areas in the glass body's surface causing a specific re-deforming of the revolution-ellipsoidal particles.

7. Method according to claim 6, wherein an energy input is made by means of laser and/or electron beam technology.

8. Method according to claim 1, comprising masking a glass surface and etching away thin surface layers from it.

9. Method according to claim 1, wherein a local energy input and/or a masking and etching away is used to produce polarizers of a structured design.

* * * * *